US012203906B2

(12) United States Patent
Fogwill et al.

(10) Patent No.: US 12,203,906 B2
(45) Date of Patent: Jan. 21, 2025

(54) DYNAMICALLY ADJUSTING SET POINTS FOR A HEATING/COOLING ELEMENT OF A CHROMATOGRAPHY COLUMN USING AVAILABLE INFORMATION

(71) Applicant: Waters Technologies Corporation, Milford, MA (US)

(72) Inventors: Michael O. Fogwill, Uxbridge, MA (US); Jason F. Hill, Milford, MA (US); Fabrice Gritti, Franklin, MA (US)

(73) Assignee: Waters Technologies Corporation, Milford, MA (US)

(*) Notice: Subject to any disclaimer, the term of this patent is extended or adjusted under 35 U.S.C. 154(b) by 620 days.

(21) Appl. No.: 17/230,325

(22) Filed: Apr. 14, 2021

(65) Prior Publication Data
US 2021/0318273 A1 Oct. 14, 2021

Related U.S. Application Data

(60) Provisional application No. 63/009,695, filed on Apr. 14, 2020.

(51) Int. Cl.
G01N 30/30 (2006.01)
G01N 30/32 (2006.01)
G01N 30/60 (2006.01)

(52) U.S. Cl.
CPC ............. G01N 30/30 (2013.01); G01N 30/32 (2013.01); G01N 30/6047 (2013.01);
(Continued)

(58) Field of Classification Search
CPC .............................................. G01N 2030/3038
See application file for complete search history.

(56) References Cited

U.S. PATENT DOCUMENTS 4,479,380 A * 10/1984 Novotny ............ B01D 11/0407
210/659
10,413,846 B2 9/2019 Bouvier et al.
(Continued)

FOREIGN PATENT DOCUMENTS

SU   1681236 A2 * 9/1991
WO   2015175448 A1   11/2015
WO   2018203231 A1   11/2018

OTHER PUBLICATIONS

International Search Report and Written Opinion for International application No. PCT/US2021/027243, mailed on Jul. 20, 2021, 11 pages.

(Continued)

Primary Examiner — Jamel E Williams
Assistant Examiner — Alex T Devito
(74) Attorney, Agent, or Firm — Goodwin Procter LLP

(57) ABSTRACT

The exemplary embodiments may determine a temperature set point for an outlet heater or cooler based on available information without requiring user input or requiring only minimal user input. The exemplary embodiments may estimate the temperature set point of the outlet heater based on available information, such as pressure delta along the column, temperature at the inlet of the chromatography column, and volumetric flow rate. In some instances, the estimate may be normalized for column dimensions, such as length and diameter. Tailing factor may also be used in determining the estimate. The estimate is not computationally burdensome and can be recalculated as the chromatography column is in use.

20 Claims, 9 Drawing Sheets

(52) U.S. Cl.
CPC ............... *G01N 2030/3015* (2013.01); *G01N 2030/3076* (2013.01); *G01N 2030/324* (2013.01)

(56) References Cited

U.S. PATENT DOCUMENTS

| | | |
|---|---|---|
| 10,478,750 B2 | 11/2019 | Bouvier et al. |
| 10,520,478 B2 | 12/2019 | Pierce |
| 2015/0129474 A1 | 5/2015 | Bouvier et al. |

OTHER PUBLICATIONS

International Preliminary Report on Patentability for International Patent Application No. PCT/US2021/027243, mailed Oct. 7, 2022.

\* cited by examiner

DYNAMICALLY ADJUSTING SET POINTS FOR A HEATING/COOLING ELEMENT OF A CHROMATOGRAPHY COLUMN USING AVAILABLE INFORMATION

CROSS-REFERENCE TO RELATED APPLICATIONS

This application claims the benefit of and priority to U.S. Provisional Patent Application No. 63/009,695, filed on Apr. 14, 2020, the entire contents of which is hereby incorporated by reference.

BACKGROUND

Thermal management of a chromatography column may be challenging. For instance, a radial thermal gradient can form in a chromatography column where the mobile phase flowing through the center of the chromatography column is of a different temperature than the mobile phase flowing through the outer radial portion of the chromatography column or where the temperature of the mobile phase entering the column is cooler/hotter than that of the oven/surrounding environment. When both flow rate and pressure drop are too large, frictional heating of the mobile phase passing through the column over the stationary phase occurs. Coupled with radial heat dissipation allowed when the column is not placed under strict adiabatic conditions, it produces this discrepancy in radial temperatures. In other cases, such as with supercritical fluid chromatography (SFC), the center of the column is cooler than the radial portion of the column due to Joule-Thompson cooling. Such a radial thermal gradient may induce chromatographic band broadening and diminish the performance of the chromatographic system.

One approach to avoid the problem of radial thermal gradients is to place the chromatography column in a column oven for matching the column wall temperature from inlet to outlet. The column oven may be set to have a temperature to compensate for the frictional temperature increase or Joule-Thompson cooling decrease so that there is diminished heat transfer from the radial regions of the chromatography column and thus diminished radial thermal gradients.

Another approach is to insulate the chromatography column. Insulating the chromatography column reduces the radial heat transfer and hence reduces the radial thermal gradients. A particularly promising approach to insulating the chromatography columns is to use vacuum insulating jackets around all or a substantial portion of a chromatography column.

An additional thermal management challenge for systems that deploy insulation and not an oven is to ensure that there is not a mismatch between the temperature at the inlet/outlet of the chromatography column walls and the temperature of the surrounding environment. Such a mismatch may result in radial thermal flux at both ends of the chromatography column that induces band broadening because the analyte experiences different thermodynamic conditions across the column cross-section. To avoid the mismatch, heaters may be positioned at the inlet and the outlet of the chromatography column.

SUMMARY

In accordance with an exemplary embodiment, a chromatography system includes a chromatography column having an inlet for receiving a mobile phase with an analyte and an outlet through which the mobile phase exits after flowing through the chromatography column. The system further includes an outlet heater or cooler positioned to heat or cool the outlet of the chromatography column and a controller for controlling an amount of heating or cooling by the heater or cooler, the controller configured for controlling the outlet heater or cooler to achieve a set point temperature at the outlet, wherein the controller is configured to set the set point temperature for the outlet heater or cooler based on an estimate calculated from a temperature at the inlet of the chromatography column, a flow rate of the mobile phase and a pressure delta.

The pressure delta may be one of a pressure delta along the column or a pressure delta across the system. The flow rate may be one of a flow rate for a pump in the chromatography system or a flow rate through the chromatography column.

The chromatography system may include a vacuum insulating jacket for insulating at least a portion of the chromatography column and may include an inlet heater positioned to impart heat to the mobile phase at the inlet of chromatography column. The chromatography system may further include an inlet sensor for sensing the temperature at or in proximity to the inlet of the chromatography column. The flow rate and a pressure delta be used to estimate an amount of temperature increase or decrease is realized by the mobile phase passing through the chromatography column. The estimate may be additionally based on at least one dimension of the chromatography column and/or peak asymmetry in chromatographic data for the chromatography column. The at least one dimension of the chromatography column may include at least one of length of the chromatography column or diameter of the chromatography column.

The chromatography system may further include an inlet heater or cooler positioned to heat or cool at the inlet of the chromatography column having a set point temperature, and the controller may assume that the temperature at the inlet of the chromatography column is the set point temperature for the inlet heater or cooler. Alternatively, the chromatography assembly may further include a temperature sensor in proximity to the inlet, and the controller may assume that the temperature at the inlet of the chromatography column is the temperature sensed by the temperature sensor. The chromatography column may be a liquid chromatography column or a supercritical fluid chromatography column. The chromatography system may include a control loop for maintaining the temperature at the outlet at the set point.

The controller may estimate the set point temperature for the outlet heater or cooler (Tout) as:

$$T\text{out}° \text{ C.} = T\text{in}° \text{ C.} + (\ln(\Delta P \text{ (atm)}) \times Fv \text{ (m}^3\text{/sec)} + \text{offset } W)/\text{adjustment factor } W/° \text{ C.},$$

where Tin is the temperature of the mobile phase at the inlet of the chromatography column, ln is a natural logarithm, $\Delta P$ is the pressure delta of the chromatography column, Fv is the flow rate of the mobile phase through the chromatography column, offset is an offset value, and adjustment factor is a value.

In accordance with an exemplary embodiment, a controller for controlling an outlet heater or cooler of a chromatography column includes processing logic for receiving a temperature at an inlet to the chromatography column, receiving a magnitude of pressure delta, receiving a flow rate and determining a temperature set point of the outlet heater for cooler from the temperature at the inlet to the chromatography column, the magnitude of the pressure delta and the flow rate of the mobile phase. The controller also includes a signal generator for generating a control signal for controlling the temperature set point of the outlet heater or cooler.

The received temperature at the inlet may be one of a temperature of the mobile phase at or near the inlet, a temperature of the inlet, a temperature set point of a mobile phase heater or an inlet heater or a temperature of the inlet. The chromatography column may be part of a chromatography system and wherein the pressure delta is one of a pressure delta across the chromatography column or a pressure delta across the chromatography system. The flow rate of the mobile phase may be a flow rate across the chromatography column or a flow for a pump or the flow rate of a pump. The flow rate may be the mass flow rate of the mobile phase, either directly measured by a mass flow sensor or may be derived from composition, temperature, and volumetric flow rate.

The processing logic may be a microprocessor, a field gate programmable array (FPGA), an application specific integrated circuit (ASIC) or electrical circuitry. The controller may be for one of a gas chromatography column or a liquid chromatography column.

In accordance with an exemplary embodiment, a method of setting a desired set point for an outlet heater or cooler for imparting heating or cooling to an outlet of a chromatography column in a chromatography system is practiced. In this method, an estimate of the desired temperature set point for the outlet heater or cooler is determined with processing logic from at least in part a volumetric flow rate, a change in pressure and a temperature at an inlet of the chromatography column. The tailing factor of chromatographic data for the chromatography column may also be a factor in the estimate. The desired set point for the outlet heater or cooler is set via a control signal to be the determined estimate.

The volumetric flow rate may be for a mobile phase through the column or a flow of a pump in the chromatography system. The change in pressure may be across the column or across the system. The temperature at the inlet may be one of a temperature set point of a mobile phase heater, a temperature set point of an inlet heater, a temperature sensed at the inlet or a temperature of a mobile phase at or near the inlet.

The determining the estimate may include determining the estimate of the desired set point (Tout) as:

$$T_{out}° C. = T_{in}° C. + (\ln(\Delta P \text{ (atm)}) \times F_v \text{ (m}^3/\text{sec)} + \text{offset } W)/\text{adjustment factor } W/° C.,$$

where Tin is the temperature of the mobile phase at the inlet of the chromatography column,
ln is a natural logarithm,
ΔP is the pressure delta of the chromatography column,
Fv is the flow rate of the mobile phase through the chromatography column,
offset is an offset value, and
adjustment factor is a value.

The processing logic may be one of electrical circuitry, a microprocessor, a microcontroller, a field gate programmable array (FPGA) or an application specific integrated circuit (ASIC).

DETAILED DESCRIPTION

One of the difficulties in using an outlet heater with a chromatography column that deploys vacuum jacketed insulation is that it is difficult to determine the proper outlet heater temperature set point (i.e., the target temperature that the outlet heater desires to achieve). Using thermodynamic equations, one can determine the set point based on many parameters, including mobile phase flow rate through the chromatography column, mobile phase temperature, mobile phase composition, column dimensions (like length and diameter), column thermal conductivity, column inlet temperature and column pressure drop. Unfortunately, many of these parameters are not available to a control system for the outlet heater and may require user input. Matters are complicated by the set point being dynamic.

The exemplary embodiments may address these difficulties by determining the temperature set point for an outlet heater or cooler based on available information without requiring user input or requiring only minimal user input. The exemplary embodiments may estimate the temperature set point of the outlet heater or cooler based on available information, such as pressure delta along the column, temperature at the inlet of the chromatography column and volumetric flow rate. In some instances, the estimate may be normalized for column dimensions, such as length and diameter. The estimate is not computationally burdensome and can be recalculated as the chromatography column is in use.

As will be discussed below, empirical data evidences that the estimates determined using this approach may produce close to optimal results. As a result, the efficiency of the system (i.e., number of theoretical plates for a peak) may be improved and hence, the productivity and performance of the chromatography system may be increased.

The principles applied in the exemplary embodiments for heaters may also be applied to coolers or combination heating/cooling elements. Thus, the exemplary embodiments may also be used in environments where an outlet cooler is used rather than an outlet heater. The chromatography columns of the exemplary embodiments may be liquid chromatography columns or supercritical fluid columns. The columns may be packed columns, open tubular columns, or packed capillary column. Radial gradients seem to be especially of interest to packed columns approx. 1 mm internal diameter and above.

Figure 1:
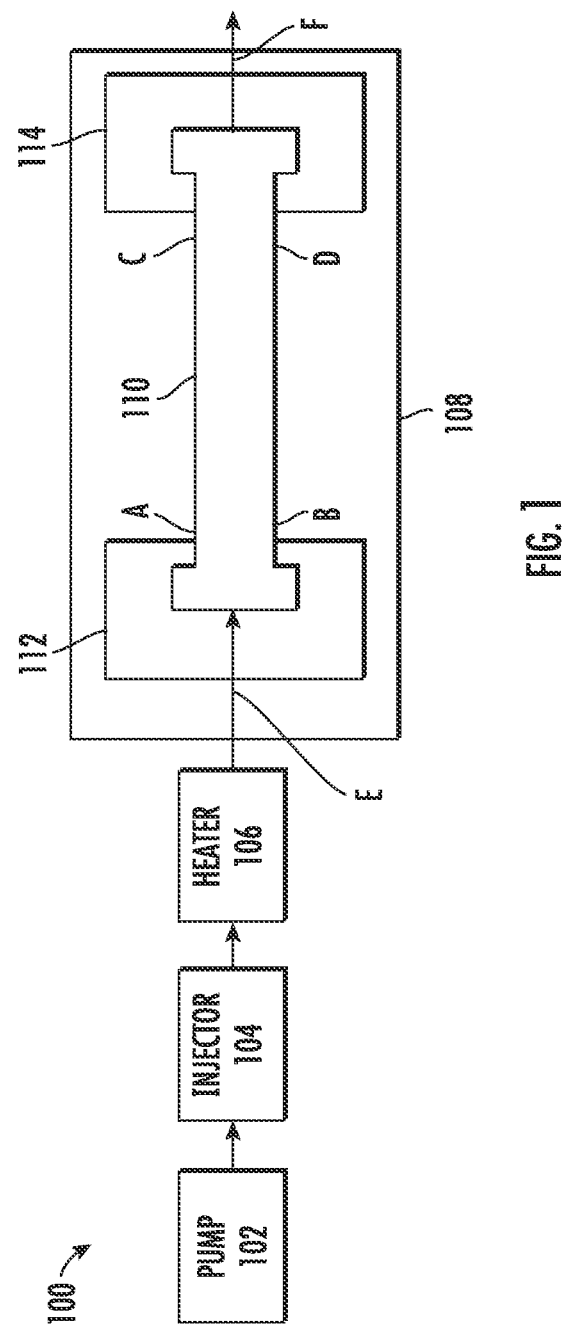
FIG. 1 depicts an illustrative chromatography system suitable for practicing an exemplary embodiment.

FIG. 1 depicts a diagram of an illustrative chromatography system 100 where an exemplary embodiment may be practiced. The chromatography system 100 includes a pump 102 for pumping a mobile phase (such as solvents) toward a chromatography column 110. An injector 104 is positioned on the flow path leading toward the chromatography column 110. The injector 104 injects a sample of analyte into the flow of the mobile phase from the pump 102. The injector 104 may include a valve, pump, a sample loop and connection to the analyte source in some embodiments. A mobile phase heater/cooler 106 may heat or cool the mobile phase prior to the mobile phase entering the chromatography column 110. An inlet heater/cooler 112 heats or cools at or near the inlet to the chromatography column 110. An outlet heater/cooler 114 heats or cools at or near the outlet of the chromatography column 110.

The chromatography column 110 may be surrounded by a vacuum insulating jacket 108. The vacuum insulating jacket is shown as surrounding the entire column and heaters 112 and 114. In alternative embodiments, the vacuum insulating jacket 108 surrounds only the column or a substantial portion of the column. A vacuum chamber may be formed between the outside of the chromatography column 110 and the walls of the jacket 108. The vacuum chamber may be formed by pumping out the air or atmospheric gas in the space surrounding the column thereby creating a vacuum chamber (with minimal atmospheric gas) as the insulating layer. An embodiment may also form the insulating layer surrounding the column by displacing the air or atmospheric gas in the space surrounding the column with an inert gas and then pumping out the inert gas in the space surrounding the column thereby creating a vacuum chamber (with minimal inert gas) as the insulating layer. Some embodiments may utilize a vacuum having a pressure of approximately equal to, or less than, $10^{-3}$ atm. The vacuum insulating jacket 108 used in an embodiment may generally be any suitable material that can withstand a vacuum and does not outgas. For example, the vacuum insulating jacket 108 may be made from one or more of steel, copper, brass, aluminum or other metals.

Temperature sensors A, B, C, D, E and F may be positioned at locations relative to the chromatography column 110. In the illustrative assembly depicted in FIG. 1, temperature sensors A and B are positioned near the leading end of the chromatography column 110, and temperature sensors C and D are positioned near the trailing end of the chromatography column 110. Temperature sensor E is positioned in proximity to the inlet of the chromatography column 110, and temperature sensor F is positioned in proximity to the outlet of the chromatography column 110. The temperature sensors A-F may be high accuracy sensors.

It should be appreciated that the chromatography assembly depicted in FIG. 1 is merely illustrative and not intended to be limiting. Other assembly configurations are possible in practicing exemplary embodiments.

Figure 2:
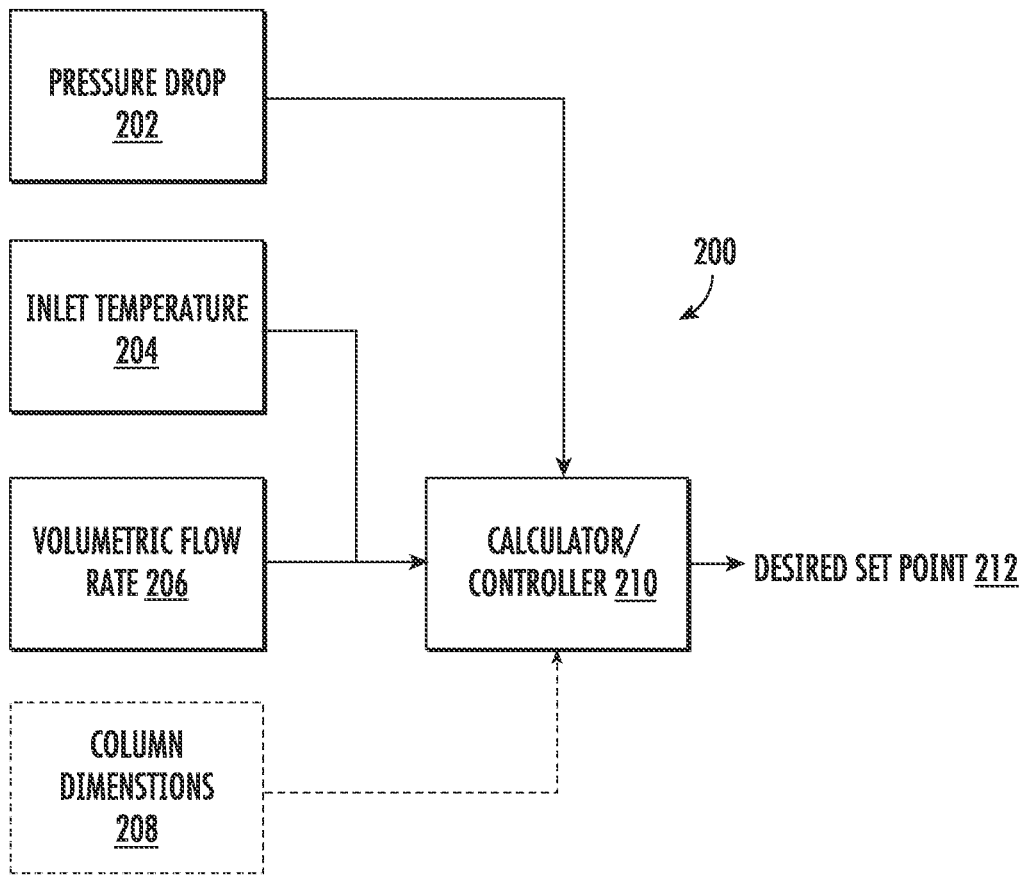
FIG. 2 depicts a block diagram of calculating an estimate for a desired temperature set point.

The temperature set point for the outlet heater/cooler 114 is set to correct for the change in the temperature of the mobile phase exiting the chromatography column 110 at the outlet. The temperature set point for the outlet heater/cooler 114 is set by determining an estimate using available information. FIG. 2 depicts varieties of information that may be used in calculating the estimate that serves as the desired set point 212 for the outlet heater/cooler 114. The estimate may be determined from the pressure drop along the column 202, the inlet temperature for the column 204 and the volumetric flow rate through the column 206. A calculator or controller 210 may use these values 202, 204 and 206 to generate the estimate that serves as the desired set point 212 as will be described in more detail below. The calculator or controller 210 may be realized as a programmed computer, a microprocessor, electrical circuitry, a microcontroller, a field programmable gate array (FPGA) or an application specific integrated circuit (ASIC), for example.

The exemplary embodiments recognize that the pressure delta along the column 202 or through the system, the inlet temperature for the column 204, the column inlet temperature and the volumetric flow rate through the column or the flow set for a pump in the system are readily available value and may be used to generate an accurate estimate of the desired set point for instances where heaters are deployed. The exemplary embodiments recognize that the difference between the temperature at the column outlet and the temperature at the column inlet is proportional to the volumetric flow rate multiplied by the pressure drop and a measure of peak asymmetry in chromatographic data for the chromatography column, such as the USP tailing factor. The tailing factor is a measure of peak tailing. The tailing factor is the distance from the front slope of the peak to the back slope divided by twice the distance from the center line of the peak to the front slope, with all measurements made at 5% of the maximum peak height. The difference in temperature at the column outlet relative to the column inlet may be expressed in a relationship as:

$$T_{out} - T_{in} \sim Fv \times \Delta P \times Tf \quad \text{(Equation 1)}$$

where $T_{out}$ is the temperature at the outlet of the column, $T_{in}$ is the temperature at the inlet of the column, Fv is the volumetric flow rate, $\Delta P$ is the pressure drop along the column and. Tf is the United States Pharmacopeia (USP) tailing factor.

In another exemplary embodiment, the difference between the temperature at the column outlet and the temperature at the column inlet is proportional to the volumetric flow rate multiplied by the pressure drop multiplied by the column length. The tailing factor may also be used in conjunction with the other enumerated factors.

Figure 3A:
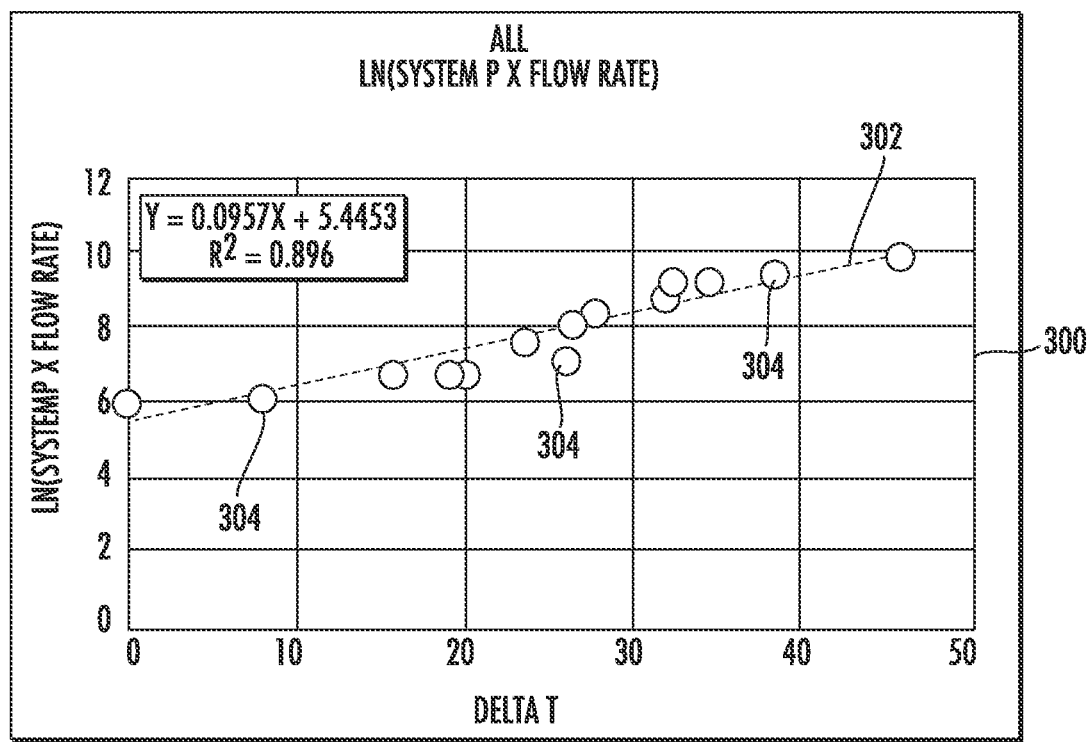
FIG. 3A depicts a plot of empirical data illustrating a relationship between the natural logarithm of a product of volumetric flow rate and pressure drop along a column and outlet temperatures for a chromatography column.

FIG. 3A depicts a plot 300 of $\ln(Fv \times \Delta P)$ and $T_{out} - T_{in}$. The plot shows the temperature difference values (such as points 304) and the curve of $\ln(Fv \times \Delta P)$ 302. The plot clearly shows the linear relationship, which can be expressed as:

$$\ln(Fv \times \Delta P) = 0.0957(T_{out} - T_{in}) + 5.443 \quad \text{(Equation 2)}$$

for a 2.1×100 mm column packed with 1.6 μm particles across various MP compositions, volumetric flow rates and inlet temperatures. An empirically derived offset of 5.443 and an adjustment factor are included. Using equation 3 and solving for outlet temperature results in:

$$T_{out} = (\ln(Fv \times \Delta P) - 5.443)/0.0957 + T_{in} \quad \text{(Equation 3)}$$

Equation 3 may be used to generate the estimate of the desired temperature set point for the outlet heater in exemplary embodiments. $T_{in}$ may be determined as the temperature sensed by the temperature sensor in proximity to the outlet (e.g., temperature sensor E) or as the temperature set point for the inlet heater or cooler (e.g., heater or cooler 112).

The empirical data to derive these equations was largely from steady-state experiments i.e. isocratic. However, the broader application of the equations is to apply them to composition-programmed gradient elution separations. Experiments have shown that the relationship, although derived from isocratic conditions, still applies to the non-steady-state environment of a gradient separations. In such cases, the outlet target would be set based on the initial, isocratic portion of the gradient after the column has equilibrated to starting conditions.

$T_{in}$ may be chosen to be the set point of a heater in proximity (i.e., at or near) the inlet, a set point of a mobile phase heater positioned before the inlet, a sensor value of the temperature of the mobile phase at or near the inlet or a sensor value of the temperature at the inlet. The flow rate Fv may be chosen as the volumetric flow rate of the mobile phase through the column or the flow setting for a pump in the system. The pressure delta ΔP may be chosen as the pressure delta along the column or through the system.

In some embodiments, it may be desirable to normalize the equation for column dimensions that differ from the dimensions used in the above case that was used to derive Equation 3. Thus, the column dimensions 208 may be used as input to the calculator/controller 210 as well. To account for different length columns, Equation 3 may need to be divided by a normalizing factor proportional to the length.

Figure 3B:
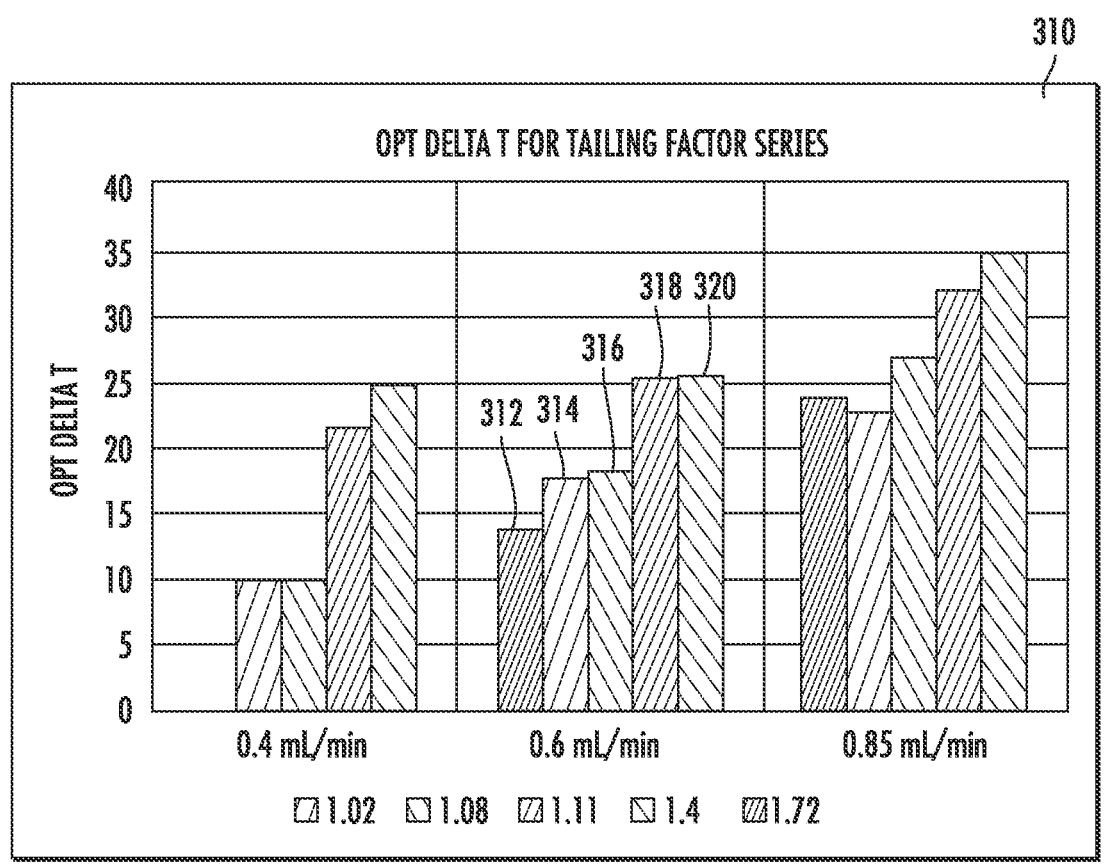
FIG. 3B depicts optimal temperature delta values over different flow rates and tailing factors for a set of empirical data.

Some empirical data also indicates that the optimal estimate of the temperature difference at the outlet relative to the inlet is affected by the tailing factor. FIG. 3B a histogram 310 of optimal differences between outlet temperature and inlet temperature for different tailing factors. Each tailing factor is associated with a bar. The bars are grouped by respective flow rates of 0.4 mL/min, 0.6 mL/min and 0.85 mL/min. The y axis is the optimal delta between outlet temperature and inlet temperature. As can be seen, the optimal delta increases as the tailing factor increases. For example, bars 312, 314, 316, 318 and 320 demonstrate this correlation.

Figure 3C:
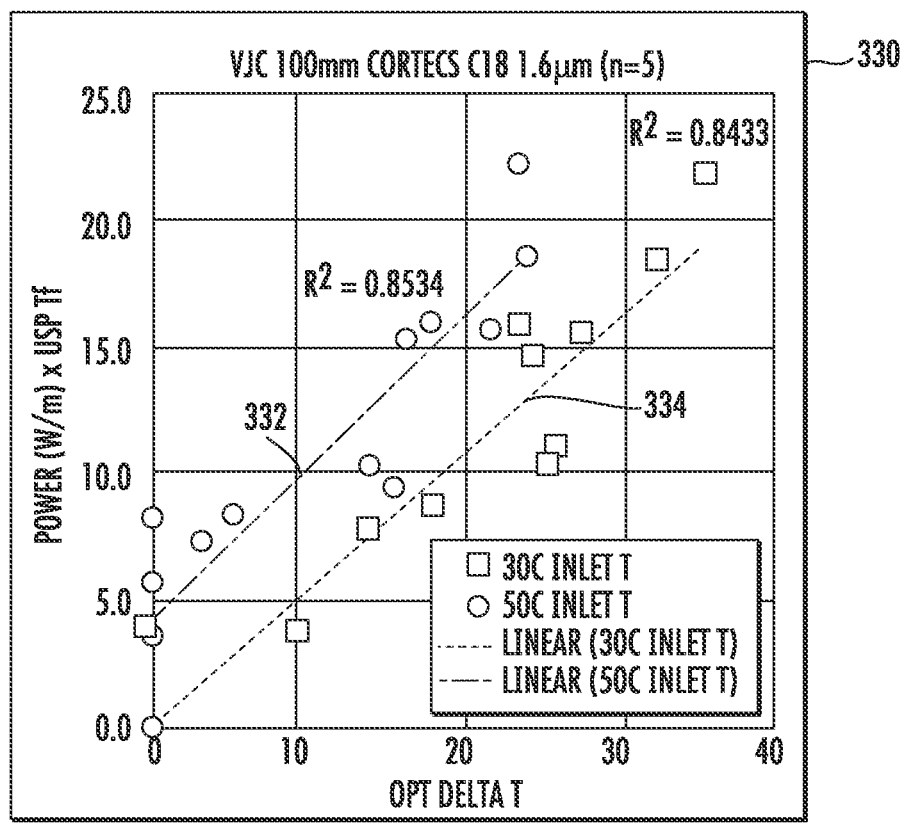
FIG. 3C plots power×tailing factor versus optimal temperature delta values to demonstrate a linear relationship in empirical data.

FIG. 3C demonstrates that the relationship of the optimal delta with the volumetric flow rate, pressure drop and tailing factor is linear (as stated in Equation 1). The plot 330 depicts Power×Tf to optimal delta. Power may be equated with Fv×ΔP. A line 332 may be drawn through the points for the optimal delta values where the inlet temperature is 30 degrees C., and another line 334 may be drawn through the point for the optimal delta values where the inlet temperature is 50 degrees C.

Figure 4A:
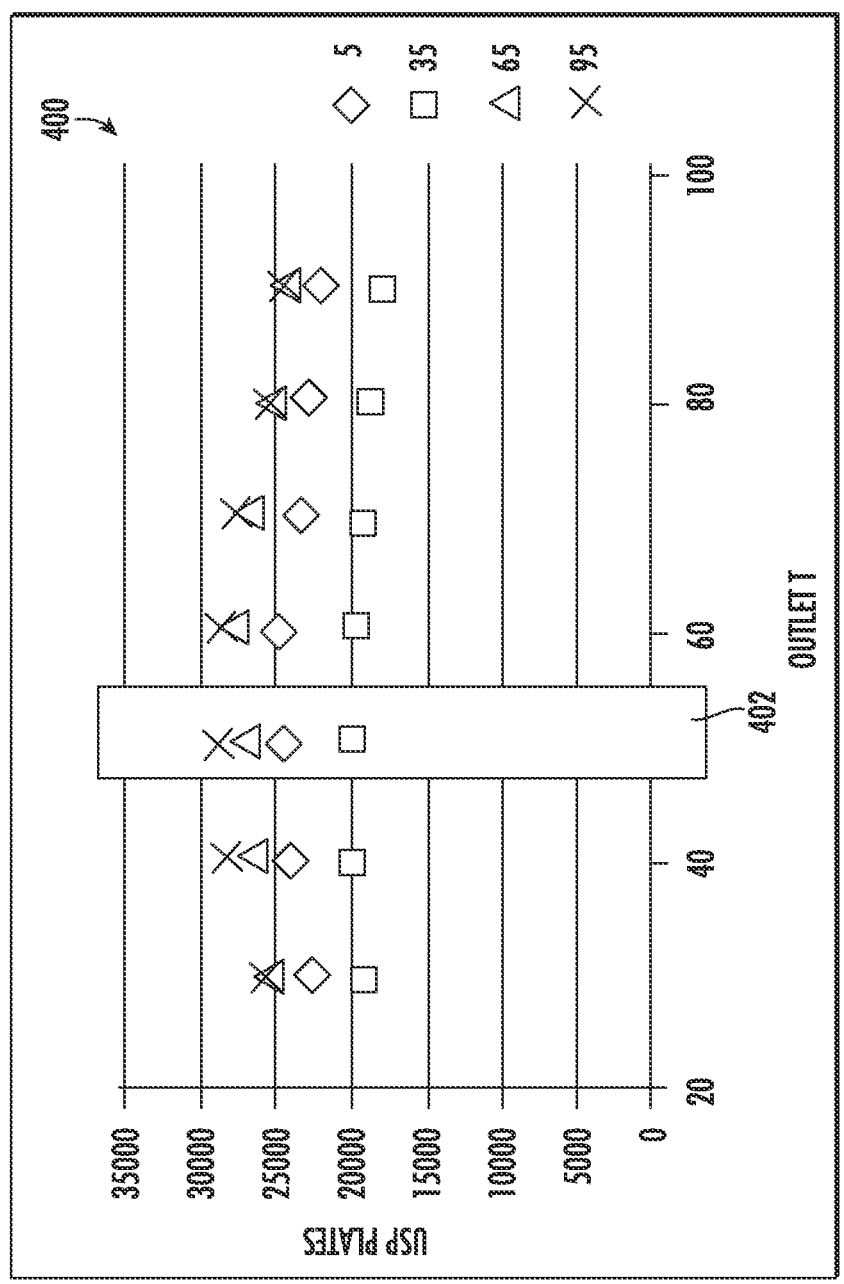
FIGS. 4A and 4B depict illustrative plots for different column pressure deltas having different optimal outlet temperatures.
Figure 4B:
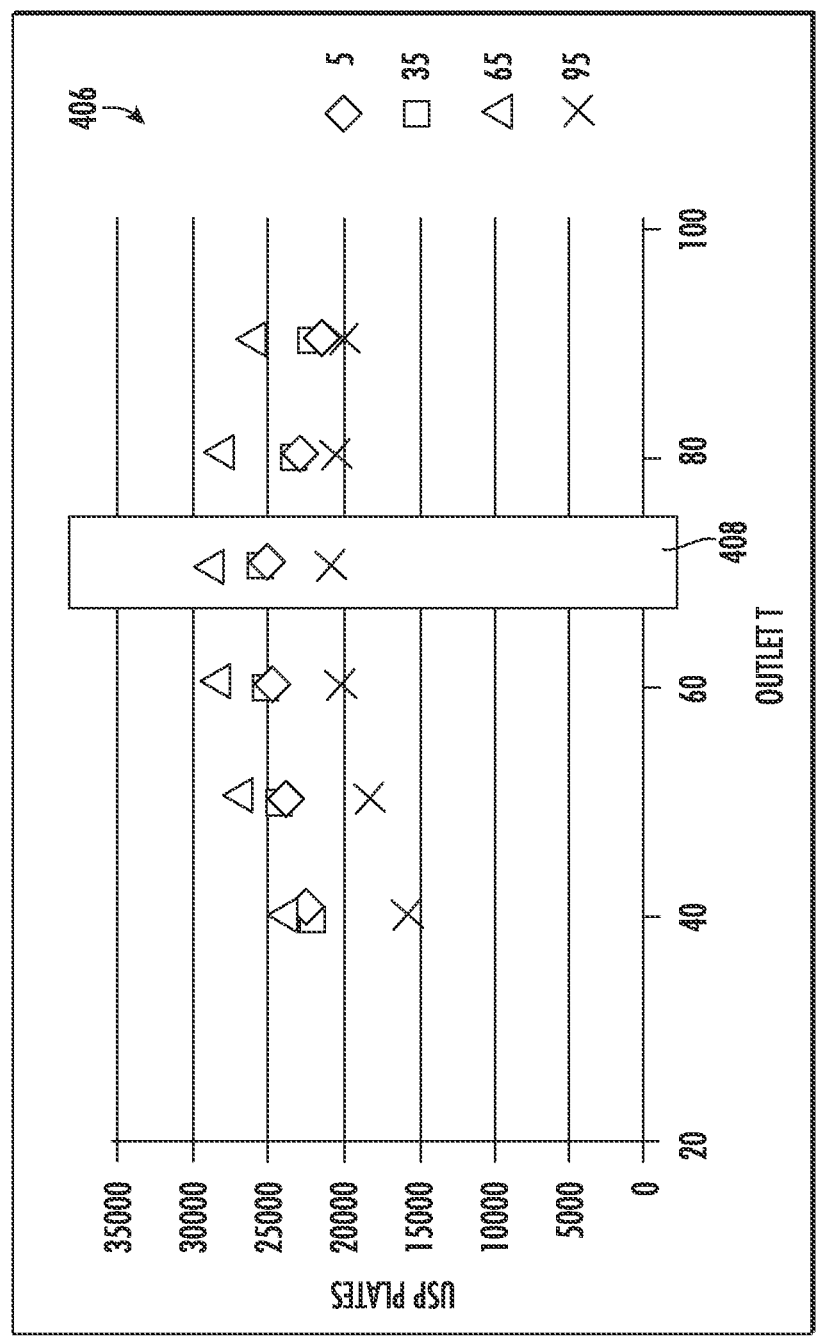

One implication of Equation 3 is that $T_{out}$ varies with pressure delta. This can be seen in FIGS. 4A and 4B. FIG. 4A depicts a plot 400 the plates processed versus outlet temperature for a liquid chromatography column. As can be seen the shaded band 402, the optimal temperature to process the most plates is around 50 degrees Celsius for a low pressure delta for different solvent compositions. In contrast, for a high-pressure delta as shown in the plot 406 of FIG. 4B, the optimal temperature is around 70 degrees Celsius as show in shaded band 408.

Figure 5:
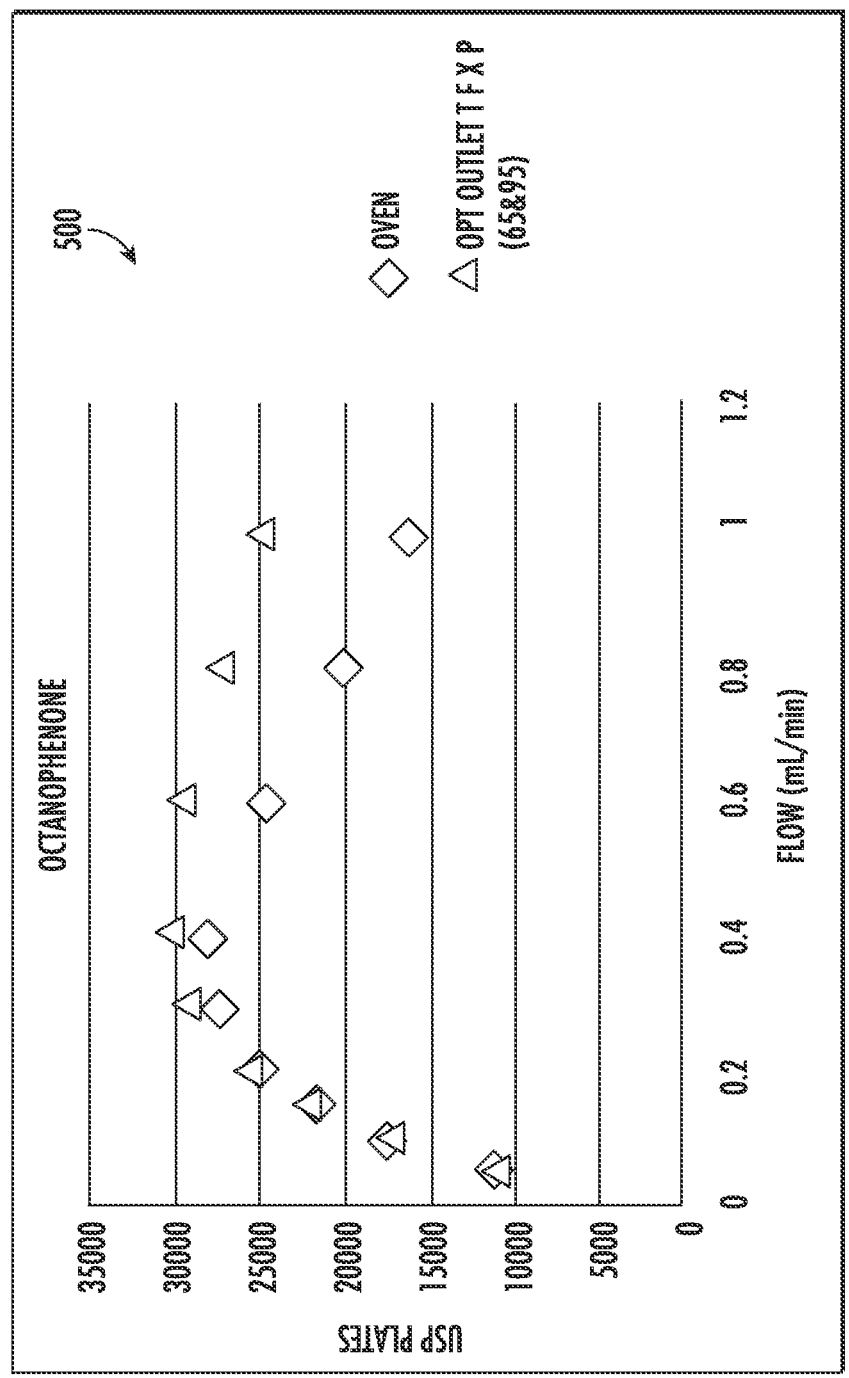
FIG. 5 depicts a plot showing a chromatography system having better performance using the exemplary embodiment relative to an approach that uses a column oven.

A comparison of the performance of a column in an oven with performance of an insulated vacuum jacketed chromatography column is depicted in the plot 500 of FIG. 5. The diamond shaped points reflect the plates processed for the case where an oven is used and the triangular points reflect the plates processed for an insulated vacuum jacketed chromatography column where the outlet heater is set at a desired set point using the approach described herein. Until the flow rate reaches 0.5 mL/min, the performances of the two approaches largely are comparable. However, as the flow rates increase the approach of the exemplary embodiments outperforms the approach using the oven.

Figure 6:
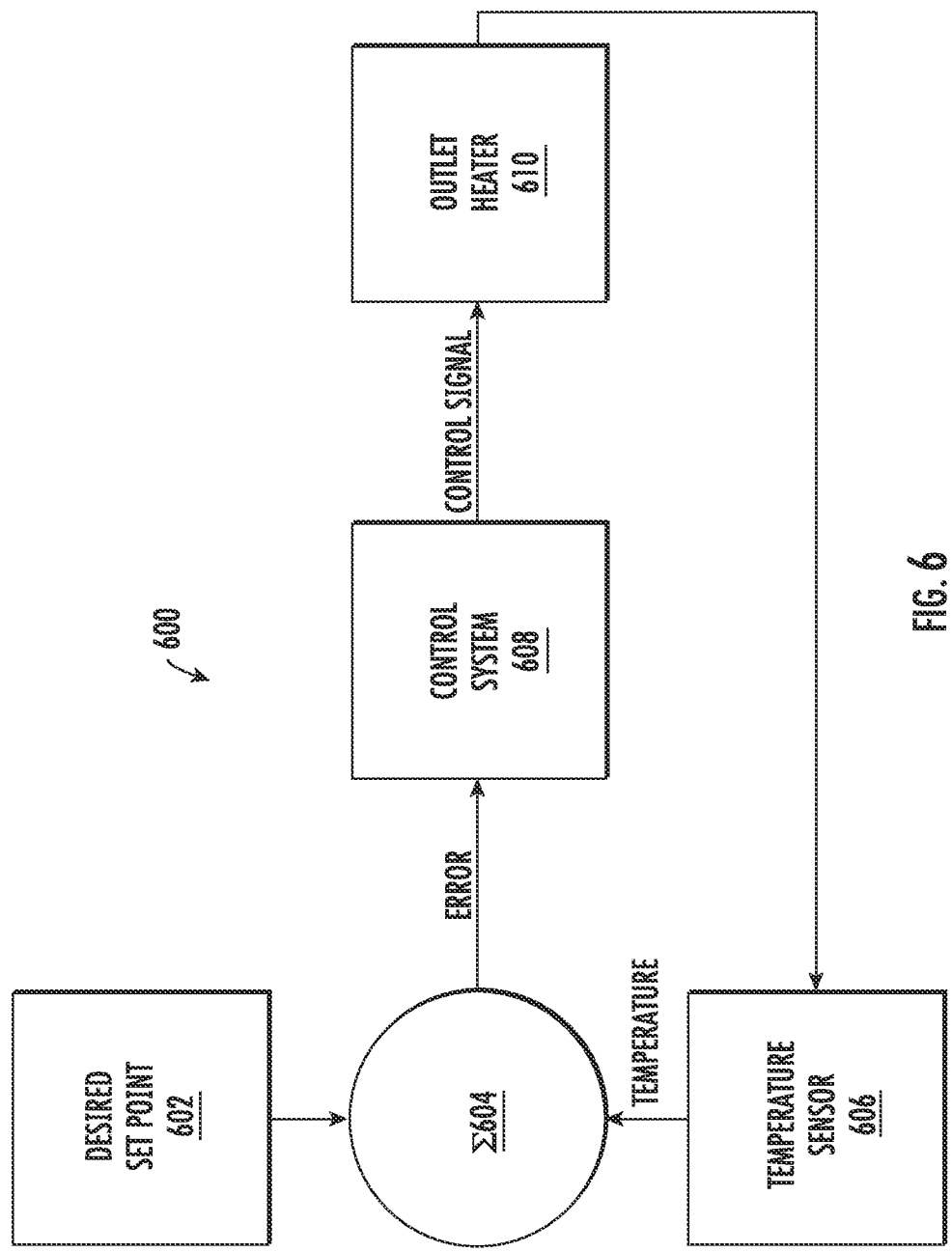
FIG. 6 depicts a block diagram of a suitable control loop for the outlet heater.

The chromatography assembly may deploy a PID control loop to adjust the heater to realize the desired set point. FIG. 6 depicts an example 600 of such a control loop. As was described above the desired temperature set point for the outlet heater 602 is determined and compared by an error node 604 with a temperature at the outlet of the chromatography column that is gathered by temperature sensor 606 positioned at or near the outlet. The error node 600 calculates an error signal between the two values. The error node 602 may be realized in hardware or a software and simply acts as an adder that calculates the difference between the two values 602 and the temperature as measured by temperature sensor 606. The resulting difference may be encoded in a signal that passes to control system 608 that generated a control signal. The control signal is sent to the outlet heater 610 to adjust the heat generated by the outlet heater 610.

As was mentioned above, in some instances coolers rather than heaters may be used at the inlet and the outlet of the chromatography column. For example, with $CO_2$ mobile phases, the mobile phase may undergo adiabatic cooling as the mobile phase passes through a chromatography column. In that instance, an outlet cooler is needed. The above-described Equation 3 may still be used but $T_{out}$ is less than $T_{in}$.

While exemplary embodiments have been described herein, those skilled in the art will appreciate that various changes in form and detail may be made without departing from the intended scope as defined in the appended claims.

The invention claimed is:

1. A chromatography system, comprising:
a chromatography column having an inlet for receiving a mobile phase with an analyte and an outlet through which the mobile phase exits after flowing through the column;
an outlet heater or cooler positioned to heat or cool at the outlet of the chromatography column;
a controller for controlling an amount heating or cooling imparted by the heater or cooler, the controller configured for controlling the outlet heater or cooler to achieve a set point temperature for the outlet of the column, wherein the controller is configured to set the set point temperature for the outlet heater or cooler based on an estimate, wherein calculation of the estimate only requires values for a temperature at the inlet of the chromatography column, an offset value, an adjustment value, and a logarithmic function of a flow rate of the mobile phase and a pressure delta.

2. The chromatography system of claim 1, further comprising an inlet heater or cooler positioned to impart heating or cooling to the mobile phase at or in proximity to the inlet of chromatography column.

3. The chromatography system of claim 1, further comprising a vacuum insulating jacket for insulating at least a portion of the chromatography column.

4. The chromatography system of claim 1, wherein the pressure delta is one of a pressure delta along the chromatography column or a pressure delta across the system.

5. The chromatography system of claim 1, wherein the flow rate is a flow set for a pump in the chromatography system or is a flow rate through the column.

6. The chromatography system of claim 1, further comprising an inlet sensor for sensing the temperature at or in proximity to the inlet of the chromatography column.

7. The chromatography system of claim 1, wherein the flow rate and the pressure delta are used to estimate an amount of temperature increase or decrease realized by the mobile phase passing through the chromatography column.

8. The chromatography system of claim 1, wherein the estimate is additionally based on at least one dimension of the chromatography column and/or peak asymmetry in chromatographic data for the chromatography column.

9. The chromatography system of claim 8, wherein the at least one dimension of the liquid chromatography column comprises at least one of length of the chromatography column or diameter of the chromatography column.

10. The chromatography system of claim 1, wherein the chromatography system further comprises an inlet heater or cooler positioned to heat or cool the mobile phase at the inlet of the chromatography column having a set point temperature and wherein the controller assumes that the temperature at the inlet of the chromatography column is the set point temperature for the inlet heater.

11. The chromatography system of claim 1, wherein the chromatography system further includes a temperature sensor in proximity to the inlet and wherein the controller assumes that the temperature at the inlet of the chromatography column is the temperature sensed by the temperature sensor.

12. The chromatography system of claim 1, wherein the chromatography column is a liquid chromatography column.

13. The chromatography system of claim 1, wherein the chromatography column is supercritical fluid chromatography column.

14. The chromatography system of claim 1, further comprising a control loop for maintaining the temperature at the outlet at the set point.

15. The chromatography system of claim 1, wherein the controller estimates the set point temperature for the outlet heater or cooler ($T_{out}$) as:

$$T_{out}=T_{in}+(\ln(\Delta P \times F_v)+\text{offset})/\text{adjustment factor},$$

where $T_{in}$ is the temperature of the mobile phase at the inlet of the chromatography column,
ln is a natural logarithm,
$\Delta P$ is the pressure delta of the chromatography column,
Fv is the flow rate of the mobile phase through the chromatography column,
offset is an offset value, and
adjustment factor is a value.

16. A controller for controlling an outlet heater or cooler of a chromatography column, comprising:
a processing logic for:
receiving a temperature at an inlet to the chromatography column,
receiving a magnitude of pressure delta,
receiving a flow rate of mobile phase;
determining a temperature set point of the outlet heater or cooler wherein the determining of the temperature set point requires only values for the temperature at the inlet to the chromatography column, an offset value, an adjustment factor, and a logarithmic function of the magnitude of the pressure delta and the flow rate of the mobile phase; and
a signal generator for generating a control signal for controlling the temperature set point of the outlet heater or cooler.

17. The controller of claim 16, wherein the received temperature at the inlet is one of a temperature of the mobile phase at or near the inlet, a temperature of the inlet, a temperature set point of a mobile phase heater or an inlet heater or a temperature of the inlet.

18. A method of setting a desired temperature set point for an outlet heater or cooler for imparting heating or cooling to an outlet of a chromatography column in a chromatography system, comprising:
determining with processing logic an estimate of the desired set point for the outlet heater or cooler, wherein the determining requires only values for a volumetric flow rate, a change in pressure, an offset value, an adjustment factor, and a temperature at an inlet of the chromatography column; and
setting the desired set point for the outlet heater or cooler via a control signal to be the determined estimate.

19. The method of claim 18, wherein the change in pressure is across the column or across the system.

20. The method of claim 18, wherein the determining the estimate comprises determining the estimate of the desired set point (Tout) as:

$$T\text{out}=T\text{in}+(\ln(\Delta P \times Fv)+\text{offset})/\text{adjustment factor},$$

where Tin is the temperature of the mobile phase at the inlet of the chromatography column,
ln is a natural logarithm,
$\Delta P$ is the pressure delta of the chromatography column,
Fv is the flow rate of the mobile phase through the chromatography column,
offset is an offset value, and
adjustment factor is a value.

\* \* \* \* \*